United States Patent [19]

Peterson

[11] Patent Number: 4,896,428
[45] Date of Patent: Jan. 30, 1990

[54] CARD GAGE
[75] Inventor: John R. Peterson, Sioux Falls, S. Dak.
[73] Assignee: Mint Finder Inc., Sioux Falls, S. Dak.
[21] Appl. No.: 296,706
[22] Filed: Jan. 13, 1989
[51] Int. Cl.$^4$ .............................................. G01B 3/14
[52] U.S. Cl. ..................................... 33/1 B; 33/1 BB; 33/501; 33/615
[58] Field of Search .............. 33/1 B, 1 BB, 1 R, 501, 33/541, 613, 614, 615, 616

[56] References Cited

U.S. PATENT DOCUMENTS

| 946,483 | 1/1910 | Blair | 33/1 B |
|---|---|---|---|
| 1,587,133 | 6/1926 | Anhof | 33/1 B |
| 2,418,421 | 4/1947 | Murray | 33/501 |
| 2,586,017 | 2/1952 | Freedman | 33/1 R |
| 2,701,195 | 2/1955 | Fleischmann | 33/615 |
| 3,308,547 | 3/1967 | Tuppen, Jr. | 33/613 |
| 4,422,241 | 12/1983 | Meeker | 33/1 BB |
| 4,734,993 | 4/1988 | Pan | 33/1 B |

FOREIGN PATENT DOCUMENTS

| 2532087 | 2/1984 | France | 33/501 |
|---|---|---|---|
| 2583870 | 12/1986 | France | 33/541 |
| 0007653 | of 1905 | United Kingdom | 33/541 |
| 1585215 | 2/1981 | United Kingdom | 33/1 BB |

Primary Examiner—William A. Cuchlinski, Jr.
Assistant Examiner—Thomas B. Will

[57] ABSTRACT

A gage for use by collectors of picture cards of sports celebrities adapted to gage the uniformity of margins on such cards without damage to the edges or the corners thereof.

10 Claims, 2 Drawing Sheets

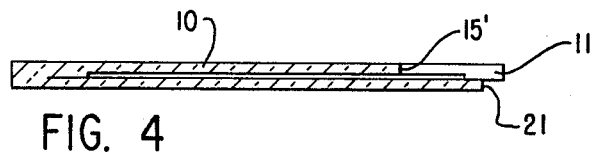
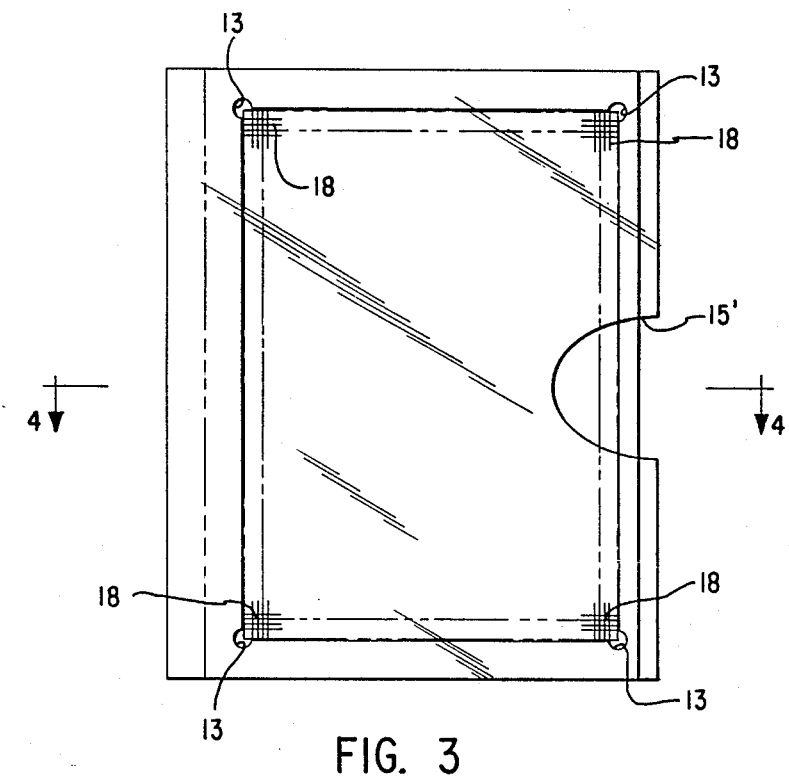
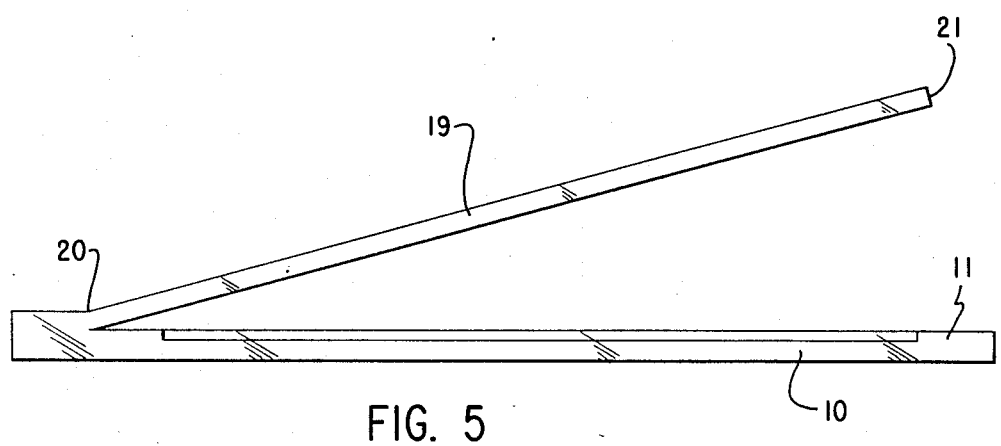

CARD GAGE

BACKGROUND AND SUMMARY OF THE INVENTION

This invention pertains to gages for collector's cards and more specifically to a gage by which the equality of the width of margins on such cards may be judged.

Collecting of cards on which pictures of athletic team members are shown has become a popular hobby. As is common to most hobbies, certain standards of the quality of the piece collected have been accepted. The quality of stamps and coins has long been judged by and for collectors of those objects. The same judgment is now being applied to collector's cards.

One of the measures by which quality of collector's cards is judged is the equal width of the margins on those cards. At least one publication dealing with the card collecting hobby has estimated that a "slight unevenness of the borders" may result in a 10% to 25% reduction in the value of the card as compared to one of the same general quality except for that defect.

For the serious collector who may, on occasion, buy or sell certain cards, such a difference may be of considerable concern. Therefore, there is a desire for a convenient way to judge the equality of margins.

By my invention I provide an easily carried, conveniently used gage for measurement of the margins. The gage is built so as to avoid any damage to the edges or the corners of the cards. Because the physical condition of those areas on the cards are also important, protection against damage to those areas is also of concern.

FIGURES

FIG. 3 is a plan view of an alternative embodiment of the invention,

FIG. 4 is a sectional view from line 4—4 of FIG. 3, and

FIG. 5 is an end view of the device showing the cover of the device of FIG. 3 in an open position and illustrating a hinge which may be common to both embodiments.

DESCRIPTION

Figure 2:
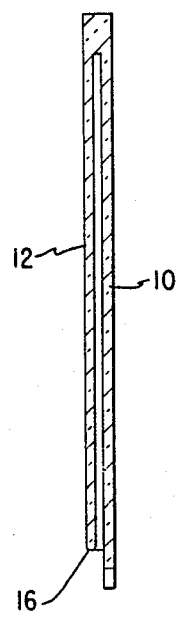
FIG. 2 is a view from line 2—2 of FIG. 1.

Briefly my invention comprises a gage for checking the uniformity of margins on collector's baseball cards which will provide an accurate and easy checking of such margins without danger of damage to the cards.

More specifically and referring to the drawings, my gage includes a front 10 formed of clear material, preferably a plastic material, but necessarily one that is fully transparent. On the edges of the top 10 I provide for a rim 11 defining a hollow in this member. The depth of the hollow should be just slightly greater than the thickness of the usual baseball card. The length and width of the hollow should also match those dimensions on the particular card to be checked. It is recognized that the cards of one manufacturer and the borders on those cards may be somewhat larger or smaller than those of another and may require somewhat different border measures. Therefore, separate gages may be necessary to measure cards of different manufacturers. The hollow is enclosed between the top 10 and a back or bottom 12 cemented to the rims 11.

Because the condition of the edges and corners of the cards may be of equal importance as the variation in width of borders, I provide safeguards to protect those areas from damage. To safeguard the corners of the card, I provide relieved areas 13 in the rims 11 so that when a card is inserted into the hollow defined by the rims, the corner will not be jammed into the apex of the angle formed by the rims at the corner. The corner of the card will then never be in danger of damage from contact with extraneous material in the corner of the gage. It is also desirable to provide a rounded edge 16 on the bottom 12 and rounded entrances 9 on the rims 11 at the entrance to the gage to prevent damage to the card as it is inserted into the hollow in the gage.

In order to identify the width of the borders, I provide on the front of the gage a series of blackened areas; the inner edge of each blackened area being at a slightly different distance from the edge of each rim 11 forming the hollow. These edges, because they are at differing distances will serve to measure the distance from the edge of the rim to the perimeter of the "sight" area of the card. For example, the inside edge of one of the series of areas 14 may be 1/64th of an inch farther from the adjacent edge of the hollow than the second, and the third a similar incremental distance more than the second. I also propose to mark the areas with such symbols as "poor", "good" and "excellent" to indicate to the user the proper margin. A comparison of the edges of the blackened areas at opposite ends of any margin will tell whether the margin is uniform on any one edge of the card, and a comparison of the edges of the areas with opposite margins will show any lack of uniformity from one side to the other.

Because the card fits into the hollow formed by the rims 11, there might be some problem encountered in removing it. Therefore, I form the front 10 with a relieved area 15. The user's finger can be inserted into this area to grasp the card and remove it from the hollow. In this way I can avoid the use of a fingernail or other tool similar to a fingernail. Use of such a device could quickly damage the edge of a card with a resultant decrease in value.

The alternative embodiment shown in FIGS. 3 and 4 is similar to that first described. The front 10 is also formed with rims 11 to form the hollow or socket into which the card to be gaged is placed.

The differences are minor. First, instead of the finger socket or relieved area 15 being on the bottom of the card, I show a similar socket 15' at one edge of the gage. Also, instead of blackened areas 14, in this embodiment I use a series of scribed lines 18. These lines 18 are at gaged distances from the edge of the hollow into which the card is to be placed. However, the relieved finger sockets and the relieved corners must be maintained in either embodiment.

Figure 1:
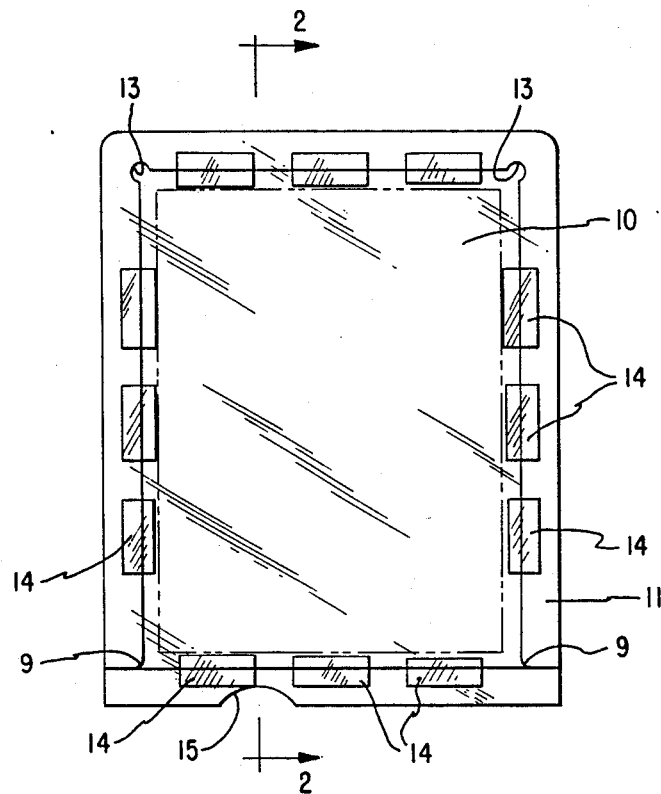
FIG. 1 is a plan view of the preferred embodiment of my invention.

In the second embodiment, I propose the use of a hinged cover 19, best shown in FIG. 5. This cover may be formed from the same plastic material as the rest of the gage. FIG. 5 shows such a device applied to the embodiment of FIG. 1. A hinge line 20 may be formed by a crease or even a slight notch in the material to provide a convenient way to hinge the cover to the body of the device. I propose also on the cover 19 to scribe lines similar to the lines 18 on the front of the gage or to provide blackened areas similar to the areas 14 on the front. In this way, margins on the reverse side of the card can be gaged at the same time as those on the front. In any case, the cover should be somewhat narrower or shorter than the front so that the free edge 21 does not match the parallel edge of the front. This form makes for easier opening of the gage with less possibility of damaging the card enclosed in it.

The operation of the device should be apparent from the above description. I believe that I have provided a convenient and inexpensive gage for checking uniform widths of margins on collector's cards.

I claim as my invention:

1. A gage for checking the uniformity of margins on collector's cards comprising a front having a transparent area at least as large as the card to be checked, rims on said front arranged to provide a hollow of a size to match the dimension of said card being checked, and gage markers on said front at regularly spaced intervals adapted to be compared with said margins.

2. The gage of claim 1 in which said rims are located on three sides of said front, a back fastened to said rims opposite said front, the space between said front and back thus defining a socket into which said card may be inserted.

3. The device of claim 2 in which said rims meet at at least two corners of said front, said rims at the corners being relieved to provide a slight enlargement of said hollow at each of said corners at which said rims meet.

4. The device of claim 1 in which said markers are darkened areas having edges at spaced intervals from the edges of said rims.

5. The device of claim 1 in which said markers are gage lines marked on the transparent area of said front.

6. The gage of claim 1 in which a cover is hingedly attached to one of said rims and is adapted to engage the other rims opposite to said front, and is thus adapted complete to cover said hollow.

7. The device of claim 6 in which said cover also is transparent in an area at least as large as said card being checked.

8. The device of claim 7 in which said cover is marked with gage means spaced at regular intervals similar to said front whereby both sides of said card can be checked.

9. The device of claim 2 in which at least one end of said front is relieved to provide a relieved area through which a user's finger may grasp said card.

10. The device of claim 6 in which said cover has a free edge opposite said hinge connection, said free edge being non-contiguous with the adjacent edge of said front.

* * * * *